No. 693,748. Patented Feb. 18, 1902.
E. F. SMITH.
APPARATUS FOR LEACHING TANBARK.
(Application filed June 14, 1901
(No Model.)
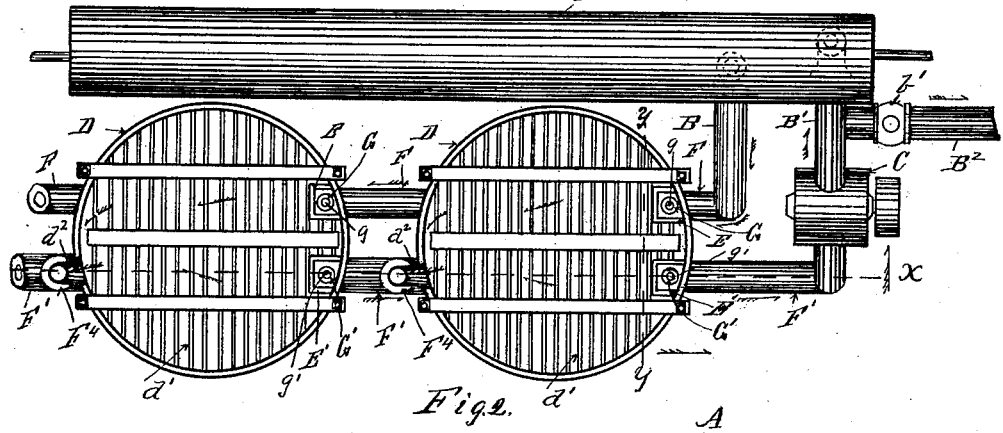
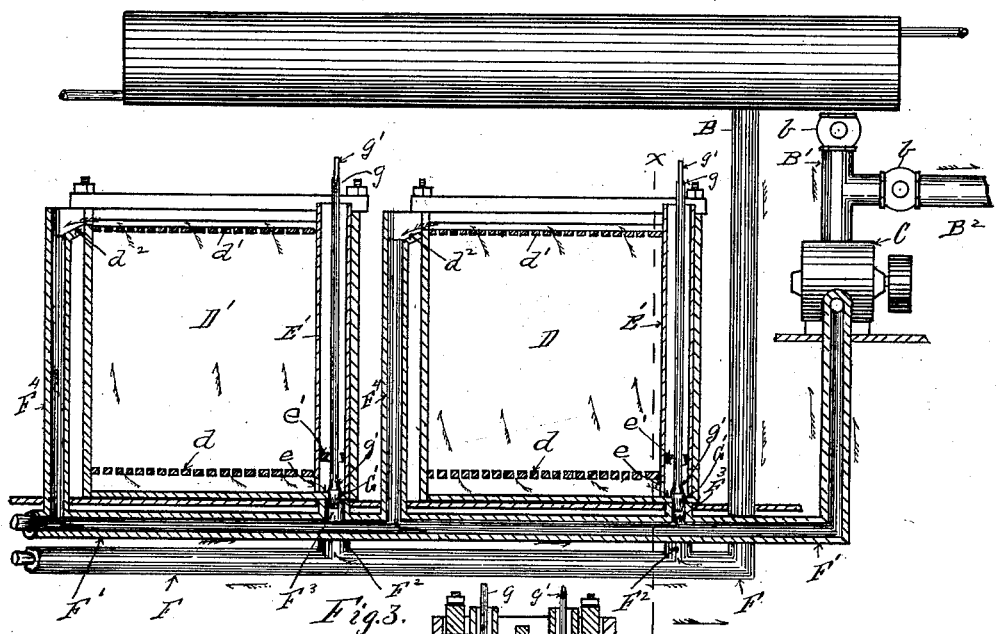
Witnesses.
Harold M Sturgeon
F. J. Bassett
Inventor.
Edward F. Smith,
By H. Sturgeon
atty.

UNITED STATES PATENT OFFICE.

EDWARD F. SMITH, OF BRADFORD, PENNSYLVANIA.

APPARATUS FOR LEACHING TANBARK.

SPECIFICATION forming part of Letters Patent No. 693,748, dated February 18, 1902.

Application filed June 14, 1901. Serial No. 64,601. (No model.)

*To all whom it may concern:*

Be it known that I, EDWARD F. SMITH, a citizen of the United States, residing at Bradford, in the county of McKean and State of Pennsylvania, have invented certain new and useful Improvements in Mechanism for Leaching Tanbark; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

This invention relates to improvements in mechanism for leaching tanbark, and has for its object the construction of a series of leaching-tanks having perforated false bottoms and perforated covers therein, with a heating-tank above said leaching-tanks, a pipe leading from said heating-tank to and under the bottoms of said series of leaching-tanks, and means for connecting said pipe with the bottom of any one or more of said leaching-tanks, and another pipe adapted to communicate both with the tops and bottoms of said tanks and leading to a pump and thence to said heating-tank or other desired point, by means of which mechanism the fluid is passed through the leaches from the bottoms thereof upward and can be circulated through any one tank in an upward direction and thence to the heating-tank and reheated and back into the bottom of such tank as many times as may be necessary or from one tank into the bottom of another with or without being passed through the heating-tank, as may be desired.

One of the results of passing the fluid upward through the tank or tanks is that the ground bark therein does not tend to pack together, and therefore the fluid contacts more freely with all parts thereof, and thereby extracts the tannin therein much more rapidly and completely than could otherwise be done. Another result attained is that the fine dust and other deleterious substances in the ground bark are detained by the particles of ground bark and do not rise with the fluid to the top of the tank and flow off in suspension in the liquor, as they do when the liquor passes downward, as they do when assisted by gravity, and therefore the liquor produced by my mechanism is comparatively free from these impurities. These and other features of my invention are hereinafter set forth and explained, and illustrated in the accompanying drawings, in which—

Figure 1 is a top or plan view of a leaching apparatus embodying my invention. Fig. 2 is a side view of the same, partially in elevation and partially in section, on the line $x$ $x$ in Fig. 1. Fig. 3 is a vertical transverse section of one of the leaching-tanks on the line $y$ $y$ in Figs. 1 and 2.

In the drawings thus illustrating my invention, A is a heating-tank; D D', two of a series of leaching-tanks located below the heating-tank A. B is a pipe leading from said heating-tank to a pipe F, extending under the bottoms of all of the series of leaching-tanks D D' and adapted to communicate therewith, and F' is a pipe extending under the series of leaching-tanks D D' and adapted to communicate with the tops and bottoms of all of said series of leaching-tanks and leading therefrom to a pump C and therefrom by a pipe B' to the heating-tank A, and in the pipe B' there is a branch pipe B², adapted to be closed by means of a shut-off valve $b'$, and there is also a shut-off valve $b$ in the pipe B'. The leaching-tanks D D' are constructed with perforated false bottoms $d$ and perforated removable covers $d'$. In one side of these tanks I place boxes E E', which extend downward through the cover $d'$ and the false bottom $d$ and connected by branches F² and F³ with longitudinal pipes F F' under the tanks D D', which pipes connect with the pipes B B'. The boxes E E' have openings $e$ $e$ therein below the perforated tank-bottoms $d$. The boxes E are provided with plugs G G', having handles $g$ $g'$ passing through guides $e'$ in said boxes E E' and extending up above the tops of the tanks D D'. The upper parts of the plugs G G' are conical in shape, so that when raised up into the guides $e'$ they cut off the passage of the fluid into the boxes E E', as illustrated in Fig. 3, so that when the plugs G are raised the fluid passes down from the heater A through the pipes B and F and by the branches F² up into the lower ends of the boxes E and out through the openings $e$ therein under the perforated tank-bottom $d$, as clearly shown in Fig. 3, and up through the ground tanbark therein, out through the perforated tank-top $d'$ and out through the spout $d^2$ and down through the vertical pipe $F^4$ to the pipe $F'$, as indicated by the arrows, and thence it is pumped to the heater A by the pipe $B'$ or to any other point desired through the pipe $B^2$, the opening of one or the other of the cut-off valves $b$ or $b'$ in the pipes $B'$ $B^2$ determining its destination. When it is desired to drain the tanks D or D', the plugs $G'$ can be raised so as to allow the liquor to pass down through the branches $F^3$ and thence by the pipes $F'$ to the pump C. I have thus shown and described an apparatus embodying two tanks. In the practical use of the invention, however, I use any number of tanks desired, all of which are connected to the pipes F and $F'$, as hereinbefore shown and described.

In operation I can pass the fluid into the bottom of any one or more of the leaching-tanks through the pipes B and F and draw it off through the pipe $F'$ to the pump C and thence by the pipe $B'$ back to the heating-tank A, from which it can be returned again to the bottom of the tank it was drawn from or to the bottom of another tank of the series, as may be desired, or the fluid may continuously flow from the heating-tank into the bottom of any tank of the series and flow out through the perforated top thereof and down through the vertical pipe $F^4$ and thence by the pipe $F'$ to the pump and thence through the pipe $B'$ to the heating-tank A, where it is reheated and again passes through the pipes B and F into the bottom of the tank from which it was taken or to any other of the series of leaching-tanks desired.

It is obvious that I can vary the construction of the mechanism described for carrying out my invention without departing from the spirit thereof. Therefore, Having described convenient mechanism for carrying out my invention, so as to enable others skilled in the art to which it appertains to practice the same, what I claim as new, and desire to secure by Letters Patent of the United States, is—

1. In a mechanism for leaching tanbark, a leaching-tank, a perforated false bottom and a perforated removable cover therein, a heating-tank above the leaching-tank, a pipe leading from the heating-tank into the leaching-tank under the false bottom thereof, a pump, a return-pipe leading to said pump from the bottom of the leaching-tank, and also connecting with an overflow from the top of said leaching-tank, a pipe leading from said pump to said heating-tank, and plugs for shutting off the connections of said pipes with the leaching-tank, substantially as and for the purpose set forth.

2. In a mechanism for leaching tanbark, a series of leaching-tanks, perforated false bottoms, and perforated removable tops therein, a heating-tank above said leaching-tanks a pipe leading from said heating-tank under the bottoms of said series of leaching-tanks, a branch connecting said pipe with each leaching-tank of said series, a shut-off plug in each leaching-tank for closing the branch pipe leading thereto, a pump, a return-pipe extending under the bottoms of said series of leaching-tanks and connecting with the suction of said pump, a branch pipe connecting each of said tanks with said return-pipe, a shut-off plug in each leaching-tank for closing the branch pipe leading therefrom to said return-pipe, a pipe leading from an overflow in each tank of said series to said return-pipe, and a pipe leading from the discharge of said pump to said heating-tank, substantially as and for the purpose set forth.

In testimony whereof I affix my signature in presence of two witnesses.

EDWARD F. SMITH.

Witnesses:
HAROLD M. STURGEON,
F. J. BASSETT.